United States Patent
Li et al.

(10) Patent No.: US 8,509,343 B2
(45) Date of Patent: Aug. 13, 2013

(54) METHODS AND APPARATUS FOR AMPLIFYING AND TRANSMITTING SIGNALS

(75) Inventors: Junyi Li, Chester, NJ (US); Xinzhou Wu, Monmouth Junction, NJ (US); Rajiv Laroia, Far Hills, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 963 days.

(21) Appl. No.: 12/477,644

(22) Filed: Jun. 3, 2009

(65) Prior Publication Data
US 2010/0310004 A1    Dec. 9, 2010

(51) Int. Cl.
*H04L 27/00*      (2006.01)

(52) U.S. Cl.
USPC .......................................... 375/295; 375/297

(58) Field of Classification Search
USPC .............. 375/260, 295, 296, 299; 455/114.3, 455/104, 92, 552; 330/149
See application file for complete search history.

(56) References Cited

U.S. PATENT DOCUMENTS

| | | | |
|---|---|---|---|
| 5,606,286 A * | 2/1997 | Bains ........................... | 330/149 |
| 5,867,478 A | 2/1999 | Baum et al. | |
| 5,889,759 A | 3/1999 | McGibney | |
| 5,915,210 A | 6/1999 | Cameron et al. | |
| 6,061,405 A | 5/2000 | Emani | |
| 6,317,470 B1 | 11/2001 | Kroeger et al. | |
| 6,757,338 B1 * | 6/2004 | Kim et al. ...................... | 375/296 |
| 6,801,586 B1 | 10/2004 | Imamura | |
| 6,879,649 B1 | 4/2005 | Radimirsch et al. | |
| 6,970,416 B1 | 11/2005 | McGibney | |
| 7,026,873 B2 * | 4/2006 | Shanbhag ...................... | 330/149 |
| 7,053,709 B1 * | 5/2006 | Darvish-Zadeh et al. .... | 330/149 |
| 7,110,727 B2 * | 9/2006 | Dekker .......................... | 455/91 |
| 7,406,261 B2 | 7/2008 | Shattil | |

(Continued)

FOREIGN PATENT DOCUMENTS

| | | |
|---|---|---|
| EP | 0883269 | 12/1998 |
| EP | 0982906 | 1/2000 |

(Continued)

OTHER PUBLICATIONS

International Search Report and Written Opinion—PCT/US2010/037333, International Search Authority—European Patent Office—Sep. 10, 2010.

(Continued)

*Primary Examiner* — Daniel Washburn
*Assistant Examiner* — Fitwi Hailegiorgis
(74) *Attorney, Agent, or Firm* — Paul S. Holdaway

(57) ABSTRACT

A wireless communications device transmits during a first time using a single tone and during a second time using a plurality of tones. The wireless communications device uses linear power amplification for transmitting multi-tone signals and non-linear power amplification for transmitting at least some single tone signals. In some embodiments a linear amplification range on a first amplifier's characteristic curve is used for the linear amplification and a non-linear amplification range on the first amplifier's characteristic curve is used for the non-linear amplification. Filtering subsequent to the amplification is controlled to accommodate the type of amplification being used. In some embodiments, the decision as to whether to use linear amplification or non-linear amplification is a function of whether the intended transmitted signal is to be a single tone signal or a multi-tone signal. In some embodiments, the decision is also a function of intended range.

20 Claims, 9 Drawing Sheets

(56) References Cited

U.S. PATENT DOCUMENTS

| | | | |
|---|---|---|---|
| 7,483,492 B2* | 1/2009 | Feher | 375/260 |
| 7,545,883 B2* | 6/2009 | Feher | 375/299 |
| 7,593,481 B2* | 9/2009 | Feher | 375/299 |
| 2003/0153285 A1* | 8/2003 | Dekker | 455/104 |
| 2004/0116152 A1* | 6/2004 | Noori et al. | 455/552.1 |
| 2004/0179629 A1* | 9/2004 | Song et al. | 375/296 |
| 2005/0220201 A1* | 10/2005 | Laroia et al. | 375/260 |
| 2006/0176969 A1* | 8/2006 | Trivedi | 375/260 |
| 2007/0032208 A1* | 2/2007 | Choi et al. | 455/114.3 |
| 2008/0304584 A1* | 12/2008 | Nishio et al. | 375/260 |

FOREIGN PATENT DOCUMENTS

| | | |
|---|---|---|
| GB | 2426420 | 2/2006 |
| GB | 2428168 | 1/2007 |
| TW | 200840277 A | 10/2008 |
| WO | 0001084 | 1/2000 |
| WO | WO0223848 | 3/2002 |
| WO | WO2007082036 | 7/2007 |

OTHER PUBLICATIONS

R. Pervez and M. Nakgawa, "Parallel Coded Optical Multicarrier Frequency Division Multiplexing—A Potential Step Towards High Speed, High Capacity and High Reliability in Optical Transmission Systems". IEICE Transactions on Communications, V. E79 B, No. 11. pp. 1677-1686, Nov. 1996.

J. Vankka, M. Kosunen. J. Hubach. and K. Halonen. "A Cordic-based Multicarrier QAM Modulator". Global Telecommunications Conference—Globecom 99. General Conference (Part A), pp. 173-177, May 12, 1999.

Taiwan Search Report—TW099117968—TIPO—Feb. 20, 2013.

* cited by examiner

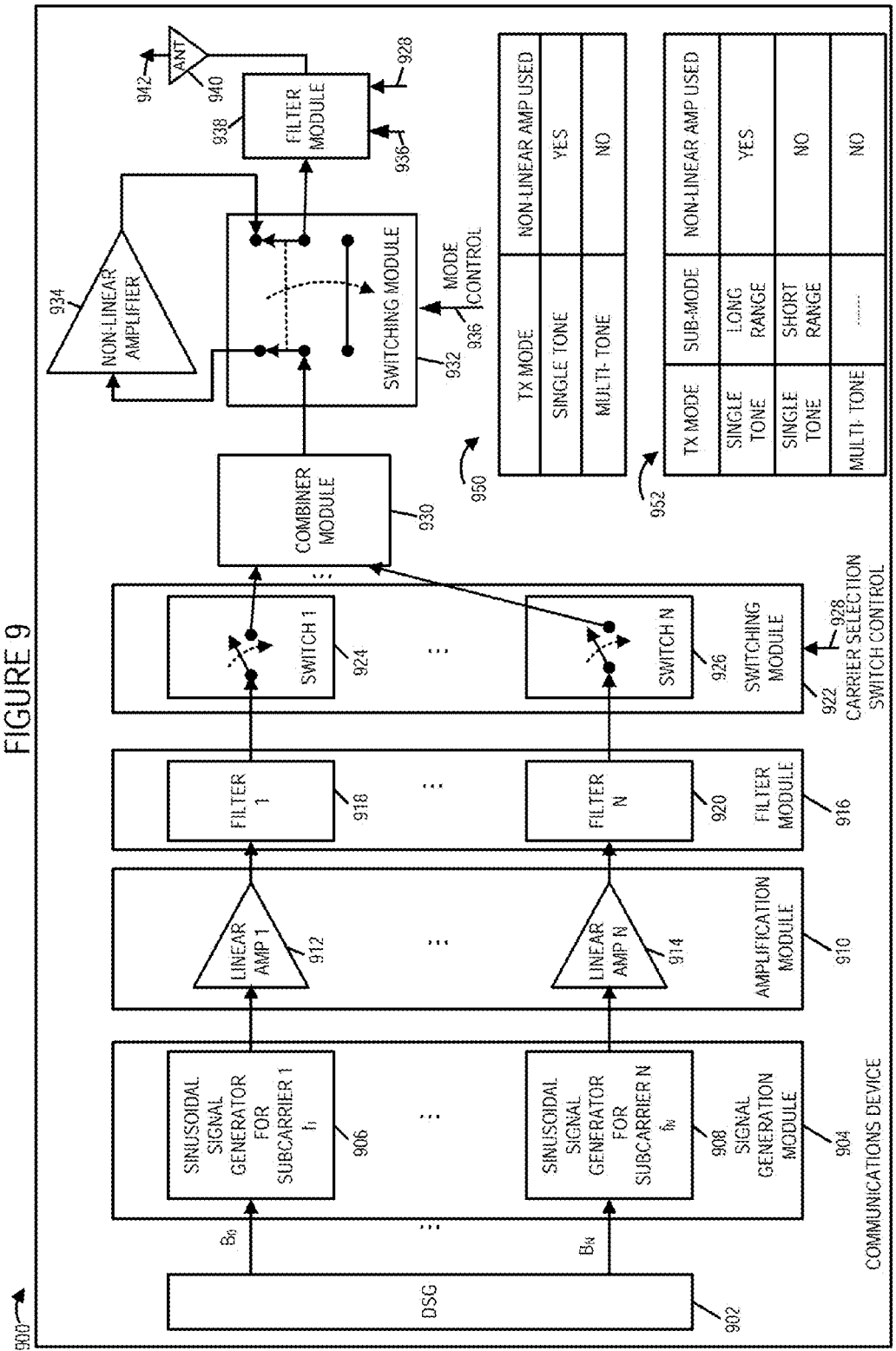

METHODS AND APPARATUS FOR AMPLIFYING AND TRANSMITTING SIGNALS

FIELD

Various embodiments relate to wireless communications, and more particularly, to methods and apparatus which can be used for amplifying signals, e.g., using non-linear amplification, prior to transmission.

BACKGROUND

In wireless communications at different times there may be different data transmission needs for a wireless device, e.g., in terms of amounts of data, type of data, range, intended recipients, acceptable bit error rate, etc. In addition, at different times, the desired transmission power level may be different, e.g., as a function of the type of communications channel, type of data, current channel conditions and/or interference conditions. In some wireless communications systems, transmission signal characteristics may vary as a function data transmission needs and/or desired transmission power level, e.g., during some times a multi-tone signal may be generated and transmitted while at other times a single tone signal may be generated and transmitted.

Generally, it is desirable to use linear amplifiers in communications systems since they do not introduce unwanted harmonics into a signal being amplified. Such harmonics can be particularly difficult to filter out in the case of multi-tone signals since attempts to filter out the effects of the use of a non-linear amplifier on a signal can often negatively impact one or more of the tones which are to be maintained in the signal being amplified.

In the case of wireless communications devices intended for the consumer market, e.g., cell phones and other mobile devices, issues of both cost and power consumption are of concern. Amplifiers which are linear over a wide power range tend to be expensive particularly if they are designed to be linear for a range of frequencies as opposed to a single frequency. Accordingly, it can be cost prohibitive in many applications to use linear amplifiers where a broad range of power outputs are to be supported. In addition to cost issues, non-linear amplification can have power efficiency advantages over linear amplification techniques making non-linear amplification desirable in devices, e.g., hand held devices, where power efficiency is of concern.

While it can be beneficial to use non-linear power amplification in some situations, non-linear power amplification is not well suited for multi-tone signal transmissions due to the interference issues associated with non-linear amplification of multi-tone signals. Thus, despite cost issues, many wireless communications devices, implemented to support the use of multi-tone signals, use linear power amplifiers for their pre-transmission power amplification operations.

Based on the above discussion there is a need for methods and/or apparatus which would allow wireless communications devices to use non-linear amplification, under at least some circumstances, without significant negative impact on the use of multi-tone signals by a device during at least some periods of device operation.

SUMMARY

Methods and apparatus related to amplification and signal transmission in a wireless communications system are described. Various described methods and apparatus are well suited to implementations in which a wireless communications device transmits at different times using different numbers of tones and/or power levels. For example a device may transmit during a first time period using a single tone and during a second time period using a plurality of tones. In some embodiments the wireless communications device uses linear power amplification for transmitting multi-tone signals and non-linear power amplification for transmitting at least some single tone signals. In some embodiments different physical amplifiers are included in the communications device and used for the different types of amplification. For example, in some but not all embodiments a first amplifier which is a linear amplifier is provided for amplifying multi-tone signals while a second amplifier which is a non-linear amplifier is provided for amplifying single tone signals. However, in other embodiments a single amplifier is used to perform linear and non-linear amplification operations at different times, e.g., with signals being transmitted at different times using different power levels.

In some embodiments a linear amplification range on a first amplifier's characteristic curve is used for the linear amplification and a non-linear amplification range on the first amplifier's characteristic curve is used for the non-linear amplification. Filtering subsequent to the amplification is controlled to accommodate the type of amplification being used. In some embodiments the non-linear range is used to amplify signals transmitted using a single tone at a higher power level than the power level used to transmit multi-tone signals which are amplified using the linear power range of the amplifier.

In one exemplary embodiment, a single-tone signal corresponds to an OFDM tone or sub-carrier, and the output of the non-linear amplification is a square wave. Subsequent filtering on the signal produced by the non-linear amplification is used to pass the single tone and filter out the higher order harmonics. In at least one embodiment when a multi-tone signal is transmitted, the multi-tones signal is amplified using linear amplification. In some such embodiments, the multi-tone signal corresponds to a plurality of tones in a communications band, and a subsequent filter used to filter the amplified signal generated by the linear amplification operation passes the full band of tones to which the multi-tone signal corresponds. The filter used following non-linear amplification may, and in some embodiments does, block one or more tones within the frequency band occupied by the multi-tone signal. The single tone signal can, and in some embodiments does, fall within the frequency band to which the multi-tone signal corresponds. In some but not necessarily all embodiments, a controllable filter may be used in the device with the filter switching between filtering modes based on whether the device is operating in a single tone or multi-tone mode of operation.

In some exemplary embodiments, an exemplary wireless communications device is part of a peer to peer communications system which implements decentralized control and decisions. In some such embodiments, the communications device implements a recurring peer to peer timing structure including a first type of interval, e.g., a peer discovery interval, in which single tone transmission is used and a second type of interval, e.g., a traffic interval, in which multi-tone signaling is used.

In some embodiments, the decision as to whether to use linear amplification or non-linear amplification is a function of whether the intended transmitted signal is to be a single tone signal or a multi-tone signal. In some embodiments, the decision as to whether to use linear amplification or non-linear amplification is a function of (i) whether the intended transmitted signal is to be a single tone signal or a multi-tone signal and (ii) intended range. In such an embodiment, some single tone signals, e.g., signals intended for a first communications range, may be amplified using linear amplification while signals intended for a second range which is longer than the first range may be amplified using non-linear amplification.

An exemplary method of operating a communications device comprises: performing a linear amplification operation on a multi-tone signal; transmitting the amplified multi-tone signal; performing a non-linear amplification operation on a single tone signal; and transmitting the amplified single-tone signal. An exemplary communications device, in accordance with an exemplary embodiment, comprises: at least one processor configured to: perform a linear amplification operation on a multi-tone signal; transmit the amplified multi-tone signal; perform a non-linear amplification operation on a single tone signal; and transmit the amplified single-tone signal. The exemplary communications device further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 9 is a drawing illustrating exemplary components included in a wireless communications device in accordance with some embodiments.

DETAILED DESCRIPTION

Figure 1:
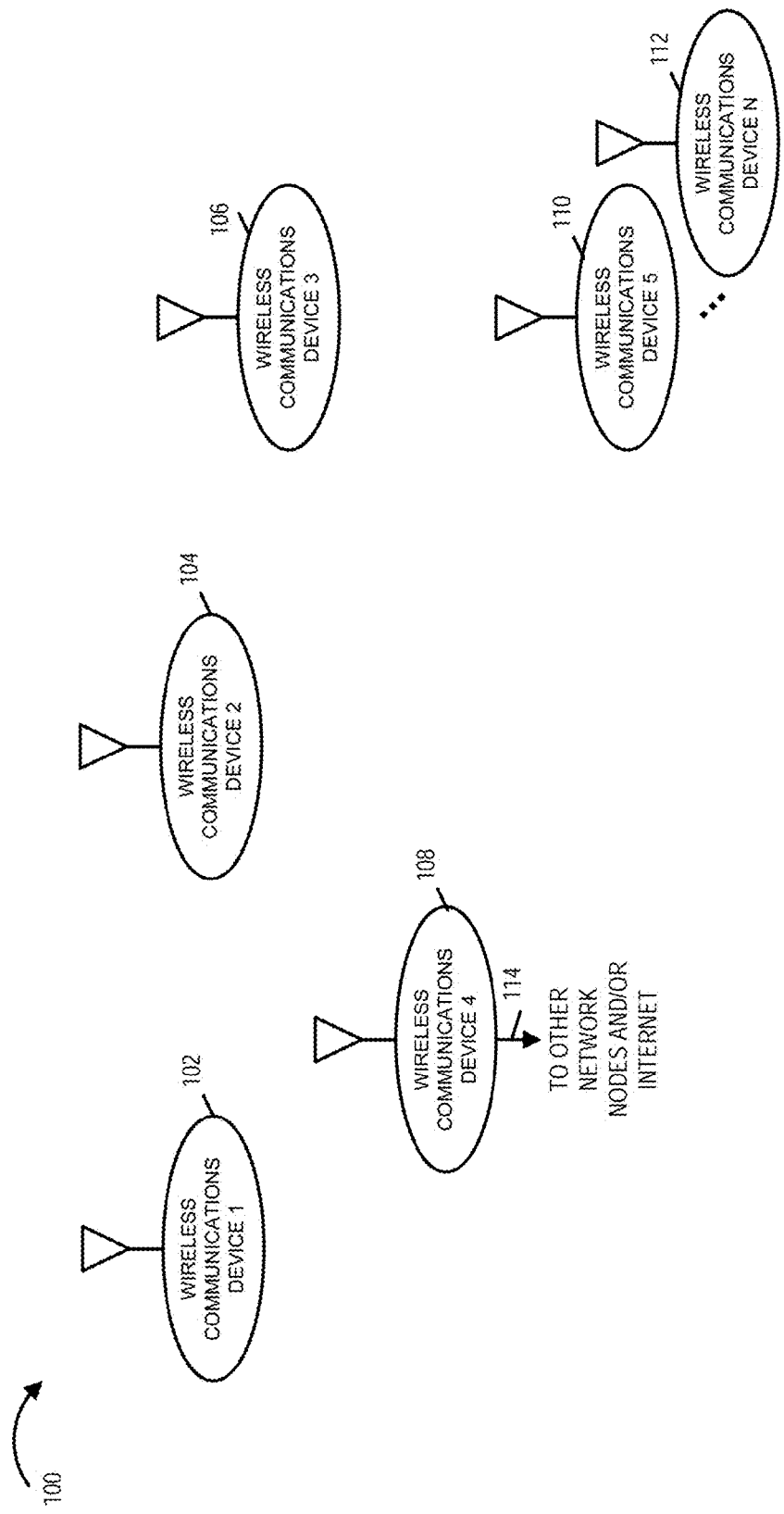
FIG. 1 is a drawing of an exemplary wireless communications system in accordance with an exemplary embodiment.

FIG. 1 is a drawing of an exemplary wireless communications system 100 in accordance with an exemplary embodiment. Exemplary wireless communications system 100 is, e.g., a peer to peer communications system using a recurring peer to peer timing structure. Exemplary wireless communications system 100 includes a plurality of wireless communications devices supporting peer to peer signaling (wireless communications device 1 102, wireless communications device 2 104, wireless communications device 3 106, wireless communications device 4 108, wireless communications device 5 110, . . . , wireless communications device N 112). At least some of the wireless communications devices are mobile communications devices, e.g., devices (102, 104, 106, 110, 112). Some of the wireless communications devices, e.g., device 4 108, include a connection to a backhaul network 114 coupling the device to other network nodes and/or the Internet.

In various embodiments, exemplary communications system 100 operates with a decentralized control structure implementation, e.g., with an air link resource allocation decision for an individual device being made by the individual device based on information available to that device. In some such embodiments, a device transmits in different transmit modes of operation at different times, e.g., as a function of the type of information to be communicated and/or as a function of an interval type in the timing structure. For example, a device may transmit on a single tone at a high power level when transmitting peer discovery signaling, e.g., broadcasting a relatively small amount of information intended to be available to be received by many devices in a wide range. Continuing with the example, the device may transmit on a set of multiple tones at a lower power level when transmitting peer to peer traffic signaling, e.g., communicating a larger amount of traffic data information directly to an individual peer device which with it has an established peer to peer connection.

In some embodiments when transmitting in the multi-tone mode the communications device uses a linear amplification region of a first amplifier, and when transmitting in single-tone mode the communications device uses a non-linear amplification region of the first amplifier. In some embodiments when transmitting in the multi-tone mode the communications device uses a linear amplifier, and when transmitting in single-tone mode the communications device uses a non-linear amplifier. In some embodiments when transmitting in the multi-tone mode the communications device uses linear amplification, when transmitting in single-tone mode long range sub-mode the communications device uses non-linear amplification, and when transmitting in single-tone mode short range sub-mode the communications device uses linear amplification.

Figure 2:
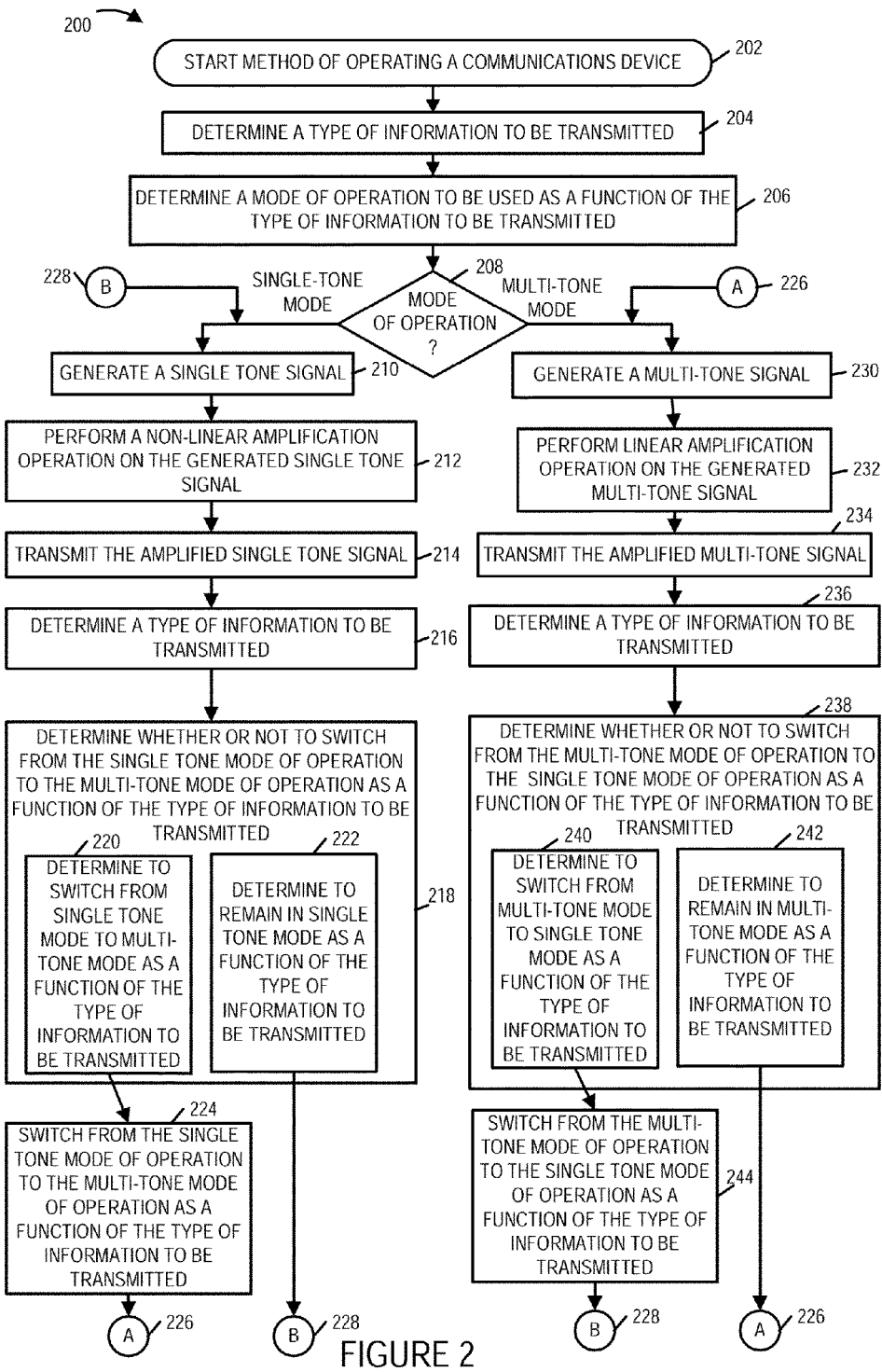
FIG. 2 is a flowchart of an exemplary method of operating a communications device in accordance with an exemplary embodiment.

FIG. 2 is a flowchart 200 of an exemplary method of operating a communications device in accordance with an exemplary embodiment. Operation starts in step 202 where the communications device is powered on and initialized and proceeds to step 204. In step 204 the communications device determines a type of information to be transmitted, and then in step 206 the communications device determines a mode of operation to be used as a function of the determined type of information to be transmitted. Operation proceeds from step 206 to step 208. In step 208, if the determined mode of operation is single-tone mode, then operation proceeds from step 208 to step 210. However, if the determined mode of operation is multi-tone mode, then operation proceeds from step 208 to step 230.

Returning to step 210, in step 210 the communications device generates a single tone signal. Then, in step 212 the communications device performs a non-linear amplification operation on the generated single tone-signal. Operation proceeds from step 212 to step 214, in which the communications device transmits the amplified single tone signal. Operation proceeds from step 214 to step 216. In step 216 the communications device determines a type of information to be transmitted. Then, in step 218 the communications device determines whether or not to switch from the single tone mode of operation to the multi-tone mode of operation as a function of the type of information to be transmitted based on the determination of step 216. Step 218 includes sub-steps 220 and 224, one of which is performed for each iteration on step 218. In sub-step 220 the communications device determines to switch from single tone mode to multi-tone mode as a function of the type of information to be transmitted. Operation proceeds from sub-step 220 to step 224, in which the communications device switches from the single tone mode of operation to the multi-tone mode of operation as a function of the type of information to be transmitted. Operation proceeds from step 224 via connecting node A 226 to step 230.

Returning to sub-step 222, in sub-step 222 the communications device determines to remain in the single tone mode as a function of the type of information to be transmitted. Operation proceeds from sub-step 222 via connecting node B 228 to step 210.

Returning to step 230, in step 230 the communications device generates a multi-tone signal. Operation proceeds from step 230 to step 232. In step 232 the communications device performs a linear amplification operation on the generated multi-tone signal. In some embodiments, performing a linear amplification operation includes amplifying the multi-tone signal using a linear amplification region of a first amplifier.

Then in step 234 the communications device transmits the amplified multi-tone signal. Operation proceeds from step 234 to step 236. In step 236 the communications device determines a type of information to be transmitted. Then, in step 238 the communications device determines whether or not to switch from the multi-tone mode of operation to the single tone mode of operation as a function of the type of information to be transmitted. Step 238 includes sub-steps 240 and 242, one of which is performed for each iteration on step 238. In sub-step 240 the communications device determines to switch from multi-tone mode to single tone mode as a function of the type of information to be transmitted. Operation proceeds from sub-step 240 to step 244, in which the communications device switches from the multi-tone mode of operation to the single tone mode of operation as a function of the type of information to be transmitted. Operation proceeds from step 244 via connecting node B 228 to step 210.

Returning to sub-step 242, in sub-step 242 the communications device determines to remain in the multi-tone mode as a function of the type of information to be transmitted. Operation proceeds from sub-step 242 via connecting node A 226 to step 230.

In some embodiments, the per tone power of the transmitted amplified single tone signal exceeds the per tone power of any tone of the transmitted amplified multi-tone signal. In various embodiments, the amplified single tone signal is transmitted using more transmission power than the multi-tone signal.

In some embodiments, performing a non-linear amplification includes amplifying said multi-tone signal using a second amplifier which is a non-linear amplifier. In some other embodiments, performing a non-linear amplification operation includes amplifying said single tone signal using a non-linear amplification region of a first amplifier.

In various embodiments, the multi-tone signal occupies a first frequency band and the signal tone signal is located within the first frequency band. In some embodiments multi-tone and single tone modes of operation correspond to different non-overlapping time periods. In some such embodiments, the single tone mode of operation is used for transmitting peer discovery information and the multi-tone mode of operation is used for transmitting traffic data.

Figure 3:
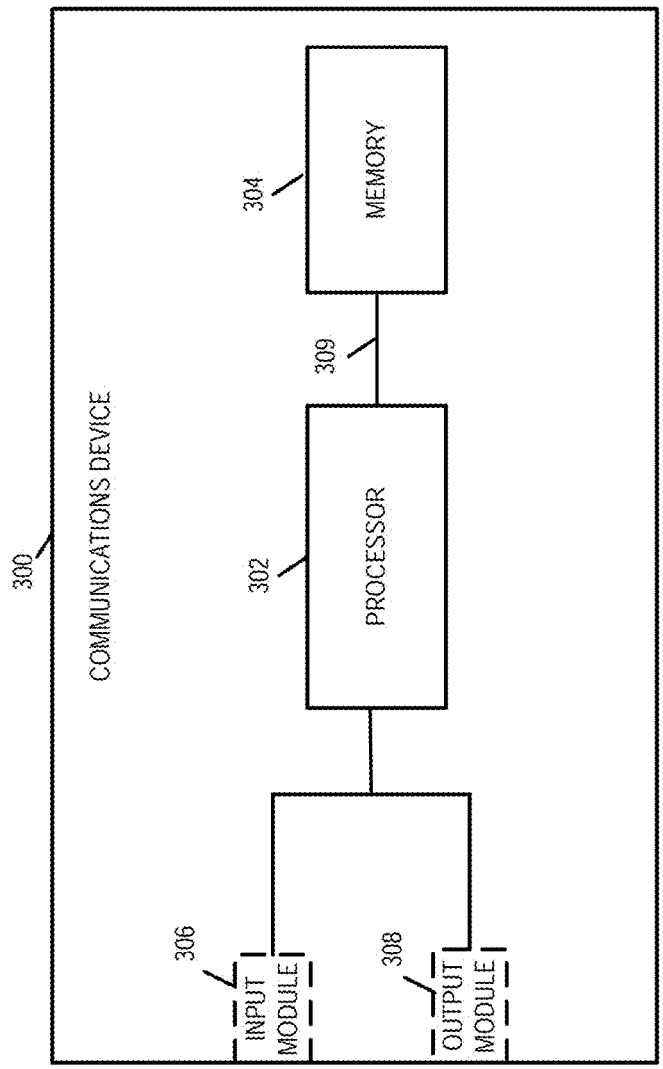
FIG. 3 is a drawing of an exemplary communications device, in accordance with an exemplary embodiment.

FIG. 3 is a drawing of an exemplary communications device 300, in accordance with an exemplary embodiment. Exemplary communications device 300 is, e.g., one of the wireless communications devices of FIG. 1. Exemplary communications device 300 may, and sometimes does, implement a method in accordance with flowchart 200 of FIG. 2.

Communications device 300 includes a processor 302 and memory 304 coupled together via a bus 309 over which the various elements (302, 304) may interchange data and information. Communications device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output.

Processor 302 is configured to: perform a linear amplification operation on a multi-tone signal; transmit the amplified multi-tone signal; perform a non-linear amplification operation on a single tone signal; and transmit the amplified single-tone signal. In some embodiments, the per tone power of the transmitted amplified single tone signal exceeds the per tone power of any tone of said transmitted amplified multi-tone signal. In various embodiments processor 302 is configured to transmit said amplified single tone signal using more transmission power than said multi-tone signal.

In some embodiments, processor 302 is configured to amplify said multi-tone signal using a linear amplification region of a first amplifier as part of being configured to perform a linear amplification operation. In some embodiments, processor 302 is configured to amplify said single-tone signal using a second amplifier which is a non-linear amplifier as part of being configured to perform a non-linear amplification operation. In some other embodiments, processor 302 is configured to amplify said single tone signal using a non-linear amplification region of said first amplifier as part of being configured to perform a non-linear amplification operation includes. In some embodiments said multi-tone signal occupies a first frequency band and wherein said single tone signal is located within said first frequency band.

In various embodiments, processor 302 is configured to perform a linear amplification operation and transmit the amplified multi-tone signal during a multi-tone mode of operation; and processor 302 is further configured to perform a non-linear amplification operation and transmitting the amplified single tone signal during a single tone mode of operation. In some such embodiments, said multi-tone and single tone modes of operation correspond to different non-overlapping periods of time; and processor 302 is further configured to switch from the multi-tone mode of operation to the single tone mode of operation as a function of the type of information to be transmitted. In some embodiments, processor 302 is configured to use said single tone mode of operation for transmitting peer discovery information and processor 302 is configured to use said multi-tone mode of operation for transmitting traffic data.

Figure 4:
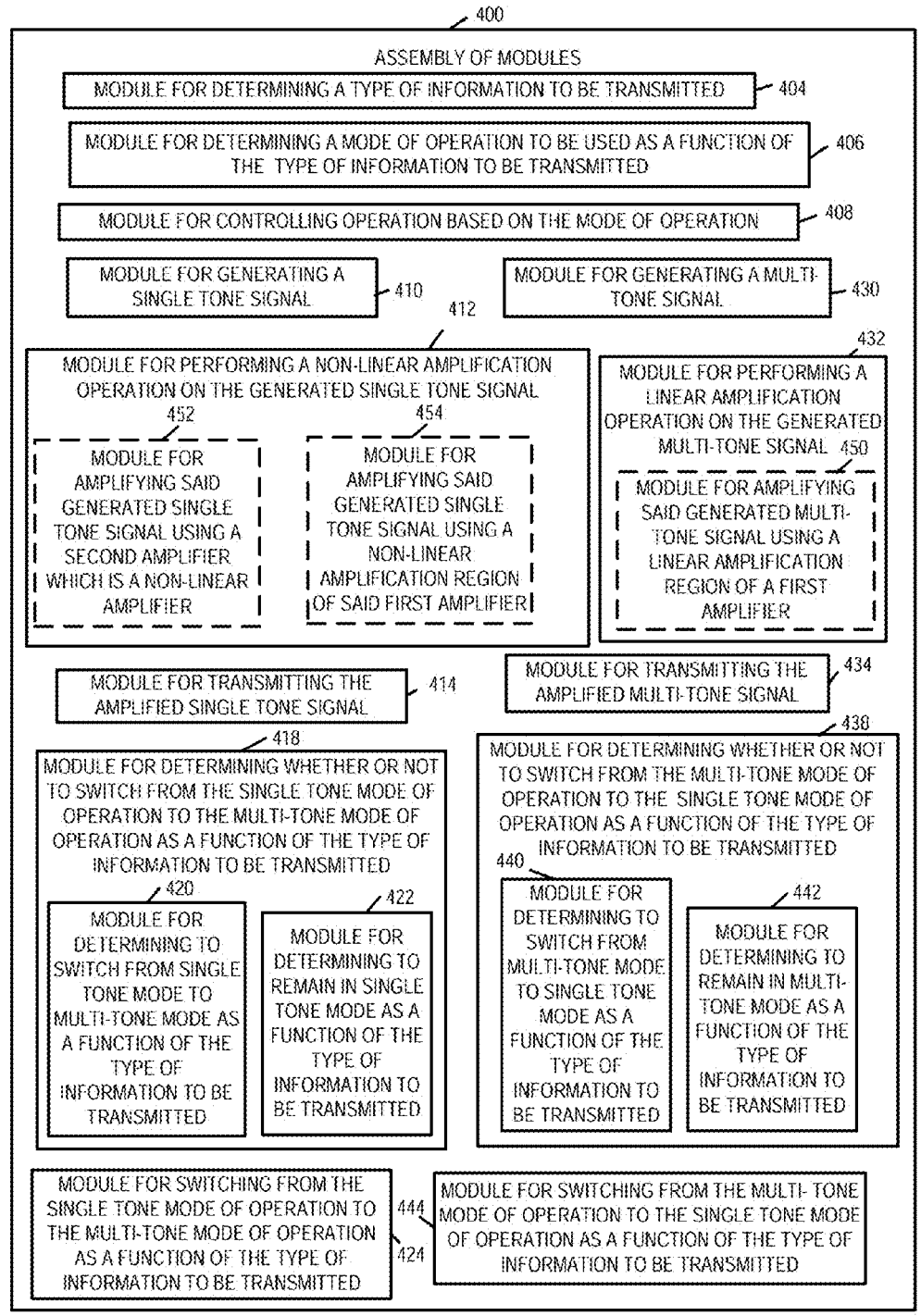
FIG. 4 is an assembly of modules which can, and in some embodiments is, used in the communications device illustrated in FIG. 3.

FIG. 4 is an assembly of modules 400 which can, and in some embodiments is, used in the communications device 300 illustrated in FIG. 3. The modules in the assembly 400 can be implemented in hardware within the processor 302 of FIG. 3, e.g., as individual circuits. Alternatively, the modules may be implemented in software and stored in the memory 304 of the communications device 300 shown in FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the communications device 300 or elements therein such as the processor 302, to perform the functions of the corresponding steps illustrated in the method flowchart 200 of FIG. 2.

Assembly of modules 400 includes a module 404 for determining a type of information to be transmitted, a module 406 for determining a mode of operation to be used as a function of the type of information to be transmitted, a module 408 for controlling operation based on the determined mode of operation. Assembly of module 400 further includes a module 410 for generating a single tone signal, a module 412 for performing a non-linear amplification operation on the generated single tone signal, a module 414 for transmitting the amplified single tone signal, a module 418 for determining whether or not to switch from the single tone mode of operation to the multi-tone mode of operation as a function of the type of information to be transmitted, and a module 424 for switching from the single tone mode of operation to the multi-tone mode of operation as a function of the type of information to be transmitted. Module 418 includes a module 420 for determining to switch from the single tone module to multi-tone mode as a function of the type of the information to be transmitted and a module 422 for determining to remain in the single tone mode as a function of the type of information to be transmitted.

Assembly of modules 400 further includes a module 430 for generating a multi-tone signal, a module 432 for performing a linear amplification operation on the generated multi-tone signal, a module 434 for transmitting the amplified multi-tone signal, a module 438 for determining whether or not to switch from the multi-tone mode of operation to the single tone mode of operation as a function of the type of information to be transmitted, and a module 444 for switching from the multi-tone mode of operation to the single tone mode of operation as a function of the type of information to be transmitted. Module 438 includes a module 440 for determining to switch from the multi-tone mode to single tone mode as a function of the type of information to be transmitted and a module 442 for determining to remain in multi-tone mode as a function of the type of information to be transmitted.

In some embodiments, the per tone power of the transmitted amplified single tone signal exceeds the per tone power of any tone of the transmitted amplified multi-tone signal. In various embodiments, module 414 transmits the amplified single tone signal using more transmission power than module 434 uses when transmitting the amplified multi-tone signal.

In some embodiments module 432 includes a module 450 for amplifying said generated multi-tone signal using a linear amplification region of a first amplifier. In various embodiments, module 412 includes one or more of a module 452 for amplifying said generated single tone signal using a second amplifier which is a non-linear amplifier and a module 454 for amplifying said generated single tone signal using a non-linear amplification region of said first amplifier.

In various embodiments, the multi-tone signal occupies a first frequency band and the single tone signal is located within said first frequency band. In some embodiments, module 432 for performing a linear amplification operation and module 434 for transmitting the amplified multi-tone signal are operated during a multi-tone mode of operation, and module 412 for performing a non-linear amplification mode of operation and module 414 for transmitting the amplified single tone signal are operated during a single tone mode of operation, e.g., under the control of module 408. In some exemplary embodiments, the single tone mode of operation is used for transmitting peer discovery information while the multi-tone mode of operation is used for transmitting traffic data.

Figure 5:
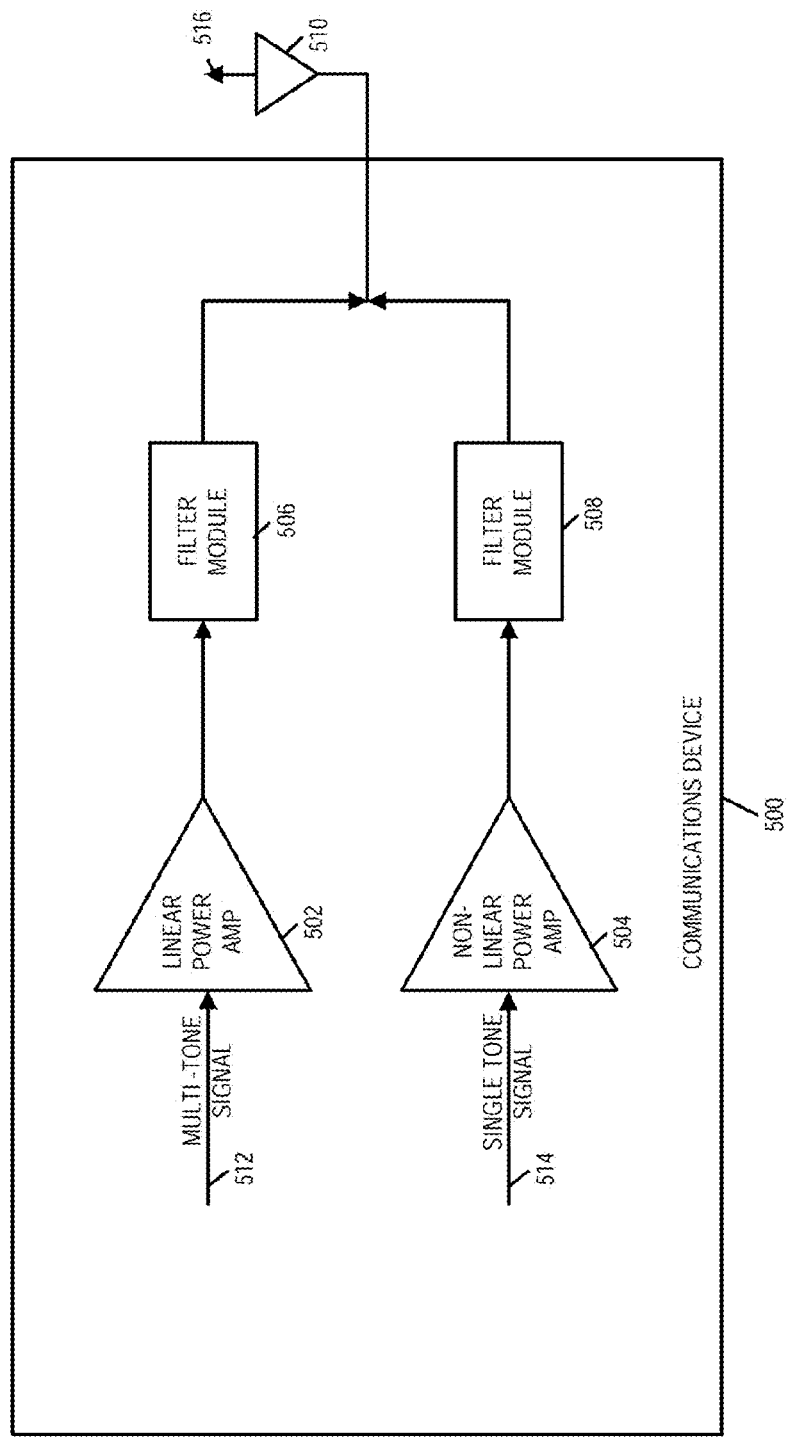
FIG. 5 is a drawing of an exemplary communications device in accordance with an exemplary embodiment.

FIG. 5 is a drawing of an exemplary communications device 500 in accordance with an exemplary embodiment. Exemplary communications device 500 includes a linear power amplifier 502 coupled to a filter module 506, which is coupled to transmit antenna 510. Exemplary communications device 500 further includes a non-linear power amplifier 504 which is coupled to a filter module 508, which is coupled to transmit antenna 510. When generated multi-tone signal 512 is to be transmitted, the communications device 500 uses linear power amplifier 502 and filter module 506 to generate the output signal 516. However, when generated single tone signal 514 is to be transmitted, communications device 500 uses non-linear power amplifier 504 and filter module 508 to generate the output signal 516. In one exemplary embodiment communications device 500 is communications device 300 of FIG. 3; linear power amplifier 502 of FIG. 5 is module 450 of assembly of modules 400 of FIG. 4; and non-linear power amplifier 504 of FIG. 5 is module 452 of assembly of modules 400 of FIG. 4.

Figure 6:
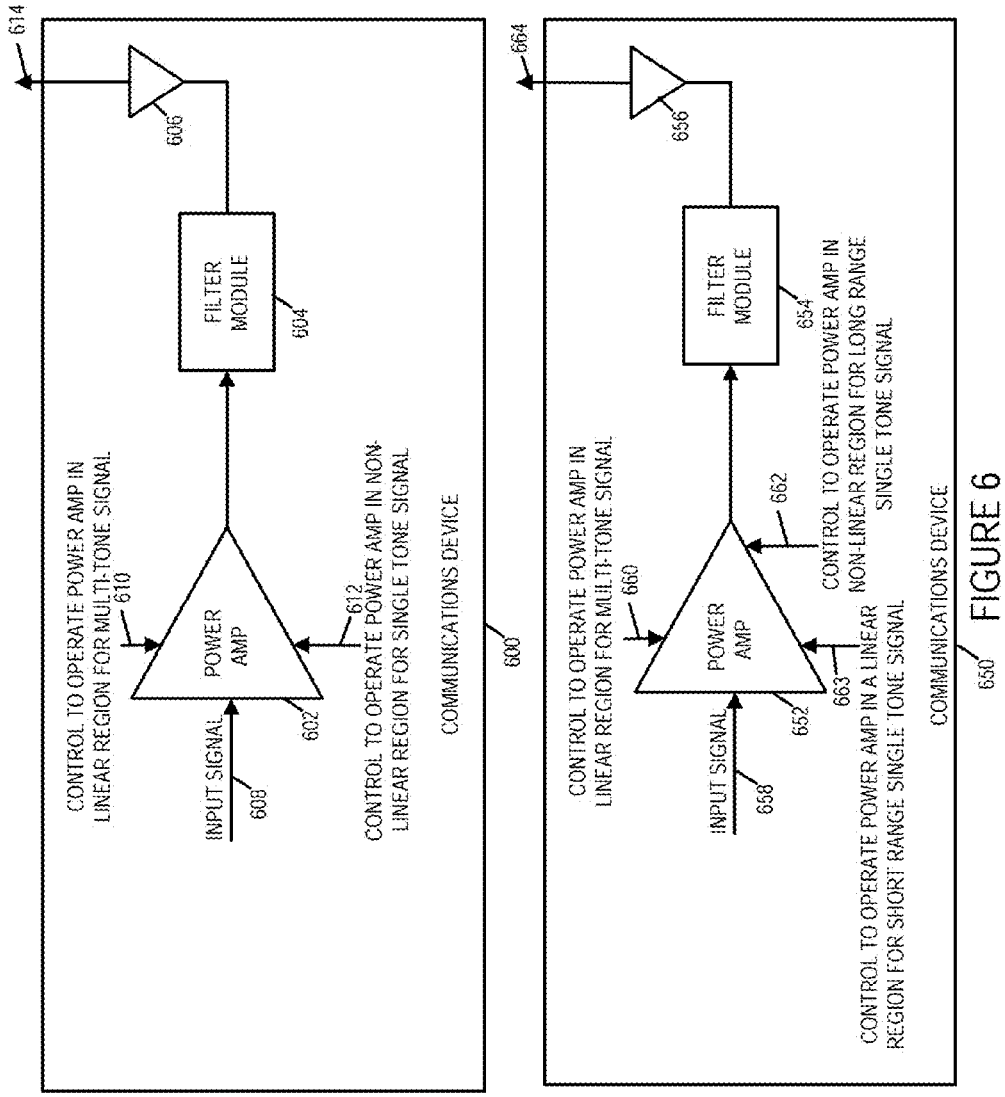
FIG. 6 is a drawing illustrating two other exemplary communications devices in accordance with some exemplary embodiments.

FIG. 6 is a drawing illustrating two other exemplary communications devices in accordance with some exemplary embodiments. Communications device 600 includes a power amplifier 602 coupled to a filter module 604 coupled to a transmit antenna 606. An input signal 608, which may be a multi-tone signal or a single tone signal, is amplified by power amp 602, filtered by filter module 604 and then transmitted over the air via transmit antenna 606 as output signal 614. Control signal 610 controls the power amplifier 602 to operate in a linear region when the generated input signal 608 is a multi-tone signal. Control signal 612 controls the power amplifier 602 to operate in a non-linear region when the generated input signal 608 is a single tone signal. Filter module 604 is also controlled and/or configured as a function of at least one of: (i) whether a single tone mode or multi-tone mode signal is be transmitted, (ii) whether linear or non-linear amplification is being used, and (iii) the tone or tones being used. In one exemplary embodiment communications device 500 is communications device 300 of FIG. 3; power amplifier 602 is the first amplifier of module 450 and module 454 of assembly of modules 400.

Communications device 650 includes a power amplifier 652 coupled to a filter module 654 coupled to a transmit antenna 656. An input signal 658, which may be a multi-tone signal or a single tone signal, is amplified by power amp 652, filtered by filter module 654 and then transmitted over the air via transmit antenna 656 as output signal 664. Control signal 660 controls the power amplifier 652 to operate in a linear region when the generated input signal 658 is a multi-tone signal. Control signal 662 controls the power amplifier 652 to operate in a non-linear region when the generated input signal 658 is a single tone signal and it is desired to transmit a long range output signal. Control signal 663 controls the power amplifier 652 to operate in a linear region when the generated input signal 658 is a single tone signal and it is desired to transmit a short range output signal. Filter module 654 is also controlled and/or configured as a function of at least one of: (i) whether a single tone mode or multi-tone mode signal is be transmitted, (ii) whether linear or non-linear amplification is being used, (iii) the tone or tones being used; and (iv) the intended transmission range.

Figure 7:
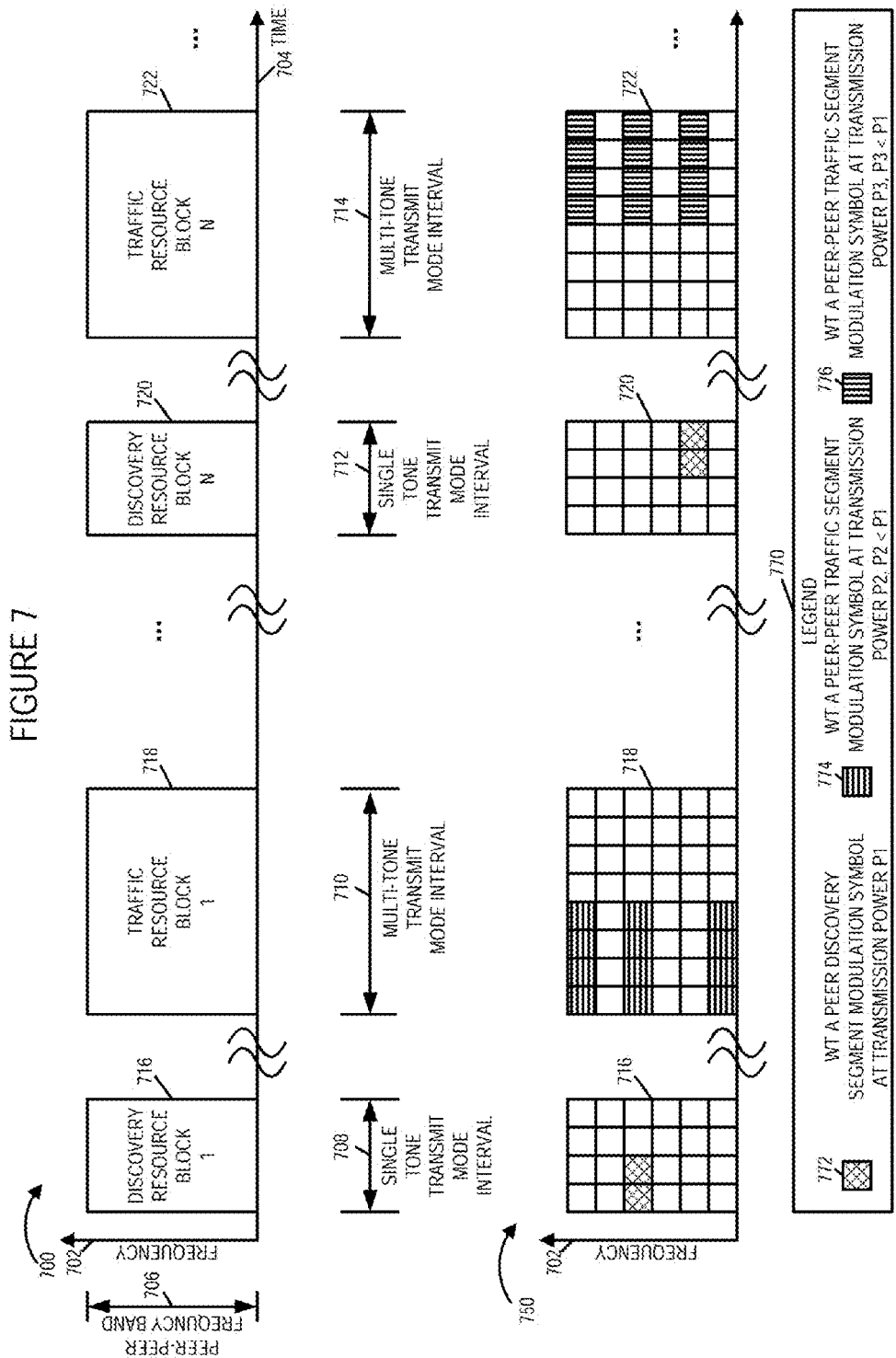
FIG. 7 is a drawing illustrating an exemplary recurring peer to peer timing structure and exemplary signals transmitted by a wireless communications device in accordance with an exemplary embodiment.

FIG. 7 is a drawing illustrating an exemplary recurring peer to peer timing structure and exemplary signals transmitted by a wireless communications device in accordance with an exemplary embodiment. Drawing 700 is a frequency vs time plot illustrating an exemplary recurring peer to peer timing structure. Vertical axis 702 represent frequency, e.g., OFDM tones, and horizontal axis 704 represents time, e.g., OFDM symbol transmission time intervals. The exemplary air link resources of the recurring peer to peer timing structure includes a plurality of discovery resources blocks (discovery resource block 1 716, . . . , discovery resource block N 720) and a plurality of traffic resource blocks (traffic resource block 1 718, . . . , traffic resource block N 722) intermingled as shown in FIG. 7. In this example, for each discovery resource block, there is a corresponding traffic resource block. In some embodiments, there are multiple traffic resource blocks for each discovery resource block. The discovery resource blocks (716, . . . , 720) and the traffic resource blocks (718, . . . , 722) are within a peer to peer frequency band 706.

In this example, during a discovery resource block, a wireless communications device, which is transmitting, operates in a single tone transmit mode of operation; and during a traffic resource block, a wireless communications device, which is transmitting, operates in a multi-tone transmit mode. Discovery resource block 1 716 corresponds to single tone transmit mode interval 708. Traffic resource block 1 718 corresponds to multi-tone transmit mode interval 710. Discovery resource block N 720 corresponds to single tone transmit mode interval 712. Traffic resource block N 722 corresponds to multi-tone transmit mode interval 714.

Drawing 750 illustrates exemplary signaling transmitted from exemplary wireless terminal A. Discovery resource block 1 716 includes 24 OFDM tone-symbols, where a tone-symbol represents the air link resource of tone for one OFDM symbol transmission time interval. Traffic resource block 1 718 includes 48 OFDM tone-symbols. Discovery resource block N 720 includes 24 OFDM tone-symbols. Traffic resource block N 724 includes 48 OFDM tone-symbols. In other embodiments, discovery resource blocks and traffic resource blocks include different numbers of tone-symbols. In various embodiments, a discovery resource blocks includes less tone-symbols than a traffic resource block. Legend 770 indicates that crosshatch shading of a square, as shown with exemplary square 772, illustrates a WT A peer discovery segment modulation symbol transmitted at transmission power P1. Legend 770 indicates that horizontal line shading of a square as with exemplary square 774 illustrates a WT A peer to peer traffic segment modulation symbol transmitted at transmission power P2, where P2<P1. Legend 770 further indicates that vertical line shading of a square as with exemplary square 776 illustrates a WT A peer to peer traffic segment modulation symbol transmitted at transmission power P3, where P3<P1.

In exemplary discovery resource block 1 716 WT A uses a peer discovery segment comprising two OFDM tone-symbols to transmit its peer discovery signal. The two OFDM tone-symbols are in different symbol transmission time intervals; and WT A transmits on a single tone during an OFDM symbol transmission time interval. In exemplary traffic resource block 1 718 WT A uses a peer to peer traffic segment comprising twelve OFDM tone-symbols to transmit its peer to peer traffic data signals. WT A transmits on three tones during an OFDM symbol transmission time interval corresponding to the peer to peer traffic segment. In exemplary discovery resource block N 720 WT A uses a peer discovery segment comprising two OFDM tone-symbols to transmit its peer discovery signal. The two OFDM tone-symbols are in different symbol transmission time intervals; and WT A transmits on a single tone during an OFDM symbol transmission time interval. In exemplary traffic resource block N 722 WT A uses a peer to peer traffic segment comprising twelve OFDM tone-symbols to transmit its peer to peer traffic data signals. WT A transmits on three tones during an OFDM symbol transmission time interval corresponding to the peer to peer traffic segment. In this example, the particular tones associated with a WT A segment change from one block to another in accordance with a tone hopping scheme being implemented.

In this example, it may be observed that the per tone power of a transmitted amplified single tone signal exceeds the per tone power of any tone of a transmitted amplified multi-tone signal. In various embodiments corresponding WT A transmissions, the total energy in one symbol time for discovery transmission is more than the total energy in one symbol time for traffic transmissions.

In some embodiments, when WT A is transmitting in single tone mode, WT A uses a non-linear amplifier, and when WT A is transmitting in multi-tone mode, WT A uses a linear amplifier. In some other embodiments, when WT A is transmitting in single tone mode, WT A uses a non-linear amplification region of a first amplifier, and when WT A is transmitting in multi-tone mode, WT A uses a linear amplification region of the first amplifier.

In some embodiments, WT A may, and sometimes does vary its transmission power for peer discovery signaling to accommodate different ranges. In one such embodiment, when WT A is transmitting in single tone mode long range sub-mode, WT A uses a non-linear amplification region of a first amplifier, when WT A is transmitting in single tone mode short range sub-mode, WT A uses a linear amplification region of the first amplifier, and when WT A is transmitting in multi-tone mode, WT A uses a linear amplification region of the first amplifier.

Figure 8:
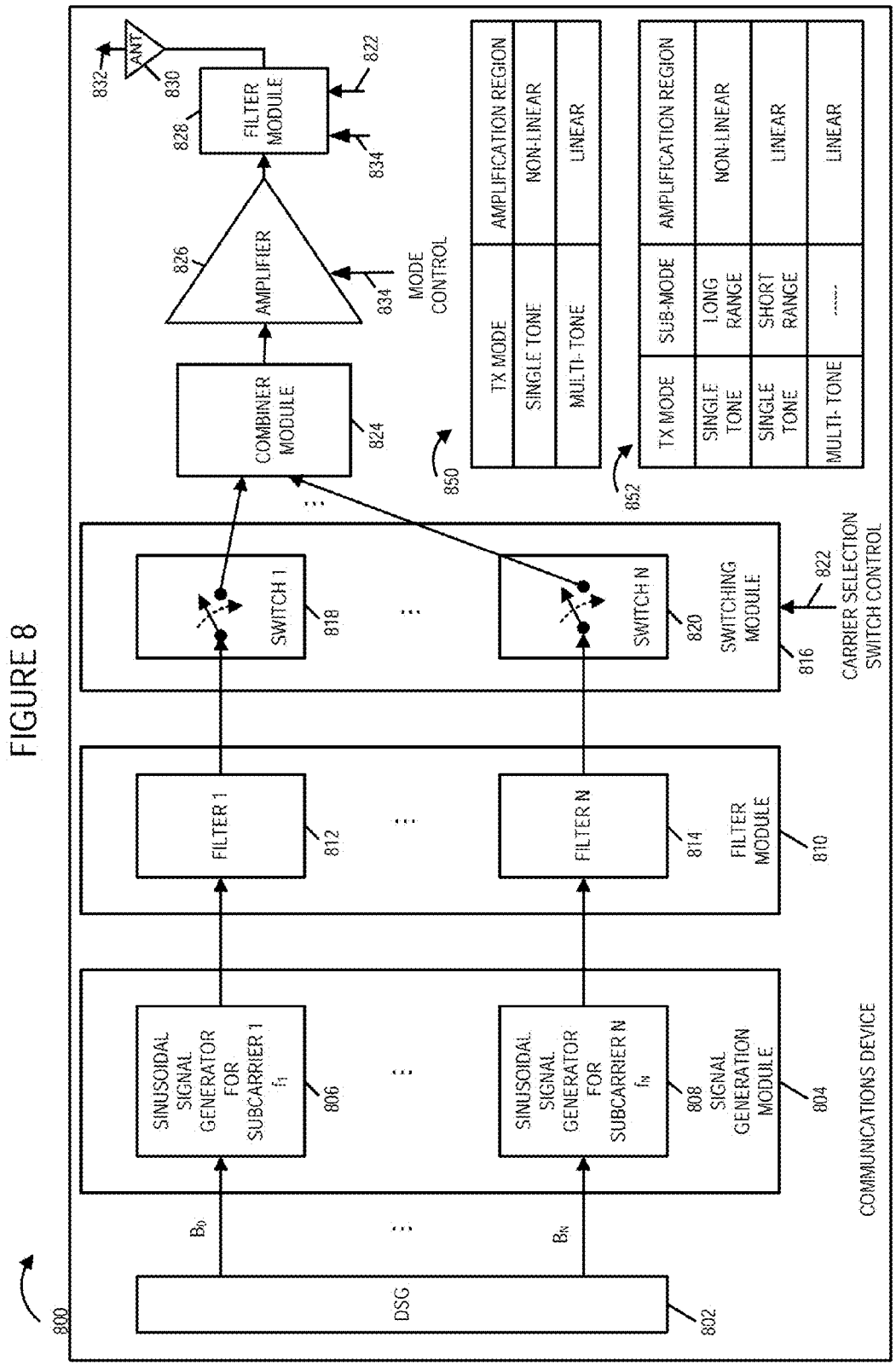
FIG. 8 is a drawing illustrating exemplary components included in a wireless communications device in accordance with some embodiments.

FIG. 8 is a drawing illustrating exemplary components included in a wireless communications device 800 in accordance with some embodiments. The exemplary wireless communications device 800 includes a digital symbol generation module 802, a signal generation module 804, a filter module 810, a switching module 816, a combiner module 824, an amplifier 826, a filter module 828 and a transmit antenna 830, coupled together as shown in FIG. 8. Signal generation module 804 includes a plurality of signal generators (sinusoidal signal generator for subcarrier 1 $f_1$ 806, . . . , sinusoidal signal generator for subcarrier N $f_N$ 808). Each sinusoidal signal generator (806, . . . , 808) corresponds to a different subcarrier in the frequency band being used. In some embodiments, a subcarrier is an OFDM tone. Filter module 810 includes a plurality of filter modules (filter 1 812, . . . , filter N 814). Switching modules 816 includes a plurality of switches (switch 1 818, . . . , switch N 820). Carrier selection switch control 822 determines which switches (818, ..., 820) should be open and which should be closed, e.g., for each symbol transmission time interval.

The digital symbol generator module 802 generates a set of digital symbols ($B_0, \ldots, B_N$) corresponding to the set of subcarriers in the transmit frequency band. Generated digital symbol $B_0$ is output from module 802, and input to module 804, where generator 806 processes the received digital symbol $B_0$ and generates a sinusoidal signal to be conveyed via subcarrier $f_1$. The generated sinusoid is filtered by filter 1 812 and the filtered signal is input to switch 1 818. Depending upon the carrier selection switch control 822 setting, switch 818 may be closed or open. When switch 1 818 is closed, the filtered output signal from filter 1 812 is allowed to pass thru to the input of combiner module 824. When switch 1 818 is open the filtered output signal from filter 1 812 is not allowed to pass thru to the input of combiner module 824.

A similar process is performed for each of the other generated digital symbols. Generated digital symbol $B_N$ is output from module 802, and input to module 804, where generator 808 processes the received digital symbol $B_N$ and generates a sinusoidal signal to be conveyed via subcarrier $f_N$. The generated sinusoid is filtered by filter N 814 and the filtered signal is input to switch N 820. Depending upon the carrier selection switch control 822 setting, switch 820 may be closed or open. When switch N 820 is closed the filtered output signal from filter N 814 is allowed to pass thru to the input of combiner module 824. When switch N 820 is open the filtered output signal from filter N 814 is not allowed to pass thru to the input of combiner module 824.

Combiner module 824, e.g., a combiner circuit, combines any received inputs and outputs the result to the input of amplifier 826. Amplifier 826, e.g., a power amplifier, is operated in different amplifications regions of its characteristic curve as a function of mode control input 834. Amplifier 826 amplifies the received input from combiner module 824 and generates an amplified output signal which is input to filter module 828, which filters the amplified output and passes the filtered output to transmit antenna 830. Filter module 828 is controlled and/or configured as a function of input signal 834 and/or input signal 822. For example, in single tone mode filter module 828 is configured to pass the single selected OFDM tone and to filter out each of the other tones, while in multi-tone mode filter module 828 is configured to pass the full set of tones. Transmit antenna transmits the generated output signal 832 over the airlink. With regard to non-null transmitted tones, when the amplifier 826 is being controlled to operate in a non-linear region, the per tone transmit power is greater than when the amplifier 826 is being controlled to operate in the linear region. In some such embodiments, the transmit energy for a symbol transmission time interval where the amplifier 826 is operating in a non-linear region is larger than the transmit energy for a symbol transmission time interval where the amplifier 826 is being controlled to operate in a linear region.

Table 850 illustrates one exemplary embodiment with regard to mode control 834. In this exemplary embodiment, when communications device 800 is set to operate in single tone transmit mode the amplifier 826 is controlled to operate in a non-linear region. In single tone transmit mode the carrier selection switch control 822 has selected to close one of the switches in the set of switches (818, ..., 820) and has left the other switches open. When communications device 800 is set to operate in multi-tone transmit mode the amplifier 826 is controlled to operate in a linear region. In multi-tone transmit mode the carrier selection switch control 822 has selected to close a plurality of the switches in the set of switches (818, ..., 820) and has left the other switches open. In some embodiments, in multi-tone mode the carrier selection control 822 selects to close each of the switches (818, ..., 820).

Table 852 illustrates another exemplary embodiment with regard to mode control 834. In this exemplary embodiment, when communications device 800 is set to operate in single tone transmit mode—long range sub-mode, the amplifier 826 is controlled to operate in a non-linear region. When communications device 800 is set to operate in single tone transmit mode—short range sub-mode, the amplifier 826 is controlled to operate in a linear region. In single tone transmit mode the carrier selection switch control 822 has selected to close one of the switches in the set of switches (818, ..., 820) and has left the other switches open. When communications device 800 is set to operate in multi-tone transmit mode, the amplifier 826 is controlled to operate in a linear region. In multi-tone transmit mode the carrier selection switch control 822 has selected to close a plurality of the switches in the set of switches (818, ..., 820) and has left the other switches open. In some embodiments, in multi-tone mode the carrier selection control 822 selects to close each of the switches (818, ..., 820). Table 850 and/or table 852, in some embodiments, are included in memory of communications device 800.

In one exemplary embodiment, communications device 800 device transmits at a power level of 29 dBm when transmitting in single tone mode long range sub-mode, and communications device 800 transmits at a power level of 23 dBm when transmitting in single tone mode short range sub-mode. In one exemplary embodiment, single tone mode short range sub-mode is used for single tone transmission with an intended maximum range of less than 500 meters, and single tone mode long range sub-mode is used for single tone transmission with an intended maximum range from 500 meters to 5 miles.

FIG. 9 is a drawing illustrating exemplary components included in a wireless communications device 900 in accordance with some embodiments. The exemplary wireless communications device 900 includes a digital symbol generation module 902, a signal generation module 904, an amplification module 910, a filter module 916, a switching module 922, a combiner module 930, a switching module 932, a non-linear amplifier 934, a filter module 938 and a transmit antenna 940, coupled together as shown in FIG. 9. Signal generation module 904 includes a plurality of signal generators (sinusoidal signal generator for subcarrier 1 $f_1$ 906, ..., sinusoidal signal generator for subcarrier N $f_N$ 908). Each sinusoidal signal generator (906, ..., 908) corresponds to a different subcarrier in the frequency band being used. In some embodiments, a subcarrier is an OFDM tone. Amplification module 910 includes a plurality of linear amplifiers (linear amplifiers 1 912, ..., linear amplifier N 914). Filter module 916 includes a plurality of filter modules (filter 1 918, ..., filter N 920). Switching modules 922 includes a plurality of switches (switch 1 924, ..., switch N 926). Carrier selection switch control 928 determines which switches (924, ..., 928) should be open and which should be closed, e.g., for each symbol transmission time interval.

The digital symbol generator module 902 generates a set of digital symbols ($B_0, \ldots B_N$) corresponding to the set of subcarriers in the transmit frequency band. Generated digital symbol $B_0$ is output from module 902, and input to module 904, where generator 906 processes the received digital symbol $B_0$ and generates a sinusoidal signal to be conveyed via subcarrier $f_1$. The generated sinusoidal signal from module 906 is amplified by linear amplifier 1 912 and the amplified signal is input to filter 1 918. Filter 1 918 filters its received input and the filtered signal is input to switch 1 924. Depending upon the carrier selection switch control 928 setting, switch 924 may be closed or open. When switch 1 924 is closed the filtered output signal from filter 1 918 is allowed to pass thru to the input of combiner module 930. When switch 1 924 is open the filtered output signal from filter 1 918 is not allowed to pass thru to the input of combiner module 930.

A similar process is performed for each of the other generated digital symbols. Generated digital symbol $B_N$ is output from module 902, and input to module 904, where generator 908 processes the received digital symbol $B_N$ and generates a sinusoidal signal to be conveyed via subcarrier $f_N$. The generated sinusoidal signal from module 908 is amplified by linear amplifier N 914 and the amplified signal is input to filter N 920. Filter N 920 filters its received input and the filtered signal is input to switch N 926. Depending upon the carrier selection switch control 928 setting, switch 926 may be closed or open. When switch N 926 is closed the filtered output signal from filter N 920 is allowed to pass thru to the input of combiner module 930. When switch N 926 is open the filtered output signal from filter N 920 is not allowed to pass thru to the input of combiner module 930.

Combiner module 930, e.g., a combiner circuit, combines any received inputs and outputs the result to the input of switching module 932. Switching module 932 either passes the received output of combiner module 930 directly to the input of filter module 938 or alternatively feds the output of combiner module 930 to the input of non-linear amplifier 934 and then feeds the amplified signal from non-linear amplifier 934 to the input of filter module 938. Switching module 932 decides whether or not to include non-linear amplifier 934 in the processing as a function of the mode control signal 936.

Non-linear amplifier 934, when switched in, amplifies the received input from combiner module 930 and generates an amplified output signal which is input to filter module 938, which filters the amplified output and passes the filtered output to transmit antenna 940. Transmit antenna transmits the generated output signal 942 over the airlink. When non-linear amplifier 934 is not switched in, the output of combiner module 930 is fed to the input of filter module 938, which filters the received signal and passes the filtered output to transmit antenna 940. Transmit antenna transmits the generated output signal 942 over the airlink. Filter module 938 is controlled and/or configured as a function of input signal 936 and/or input signal 928. For example, in single tone mode filter module 936 is configured to pass the single selected OFDM tone and to filter out each of the other tones, while in multi-tone mode filter module 936 is configured to pass the full set of tones.

With regard to non-null transmitted tones, when the non-linear amplifier 934 is being used, the per tone transmit power is greater than when the amplifier 934 is not being used. In some such embodiments, the transmit energy for a symbol transmission time interval where the amplifier 934 is being used is larger than the transmit energy for a symbol transmission time interval where the amplifier 934 is not being used.

Table 950 illustrates one exemplary embodiment with regard to mode control 936. In this exemplary embodiment, when communications device 900 is set to operate in single tone transmit mode, the non-linear amplifier 934 is controlled to be switched in the processing chain and used. In single tone transmit mode the carrier selection switch control 928 has selected to close one of the switches in the set of switches (924, . . . , 926) and has left the other switches open. When communications device 900 is set to operate in multi-tone transmit mode the non-linear amplifier 934 is controlled to be switched out of the processing chain and not used. In multi-tone transmit mode the carrier selection switch control 928 has selected to close a plurality of the switches in the set of switches (924, . . . , 926) and has left the other switches open. In some embodiments, in multi-tone transmit mode the carrier selection switch control 928 selects to close each of the switches (924, . . . , 926).

Table 952 illustrates another exemplary embodiment with regard to mode control 936. In this exemplary embodiment, when communications device 900 is set to operate in single tone transmit mode—long range sub-mode, the non-linear amplifier 934 is controlled to be switched into the processing chain and used. When communications device 900 is set to operate in single tone transmit mode—short range sub-mode, the non-linear amplifier 934 is controlled to be switched out of the processing chain and not used. In single tone transmit mode, the carrier selection switch control 922 has selected to close one of the switches in the set of switches (924, . . . , 926) and has left the other switches open. When communications device 900 is set to operate in multi-tone transmit mode, the non-linear amplifier 934 is controlled to be switched out of the processing chain and not used. In multi-tone transmit mode, the carrier selection switch control 928 has selected to close a plurality of the switches in the set of switches (924, . . . , 926) and has left the other switches open. In some embodiments, in multi-tone transmit mode, the carrier selection switch control 928 selects to close each of the switches in the set of switches (924, . . . , 926). Table 950 and/or table 952, in some embodiments, are included in memory of communications device 900.

In one exemplary embodiment, communications device 900 device transmits at a power level of 29 dBm when transmitting in single tone mode long range sub-mode, and communications device 900 transmits at a power level of 23 dBm when transmitting in single tone mode short range sub-mode. In one exemplary embodiment, single tone mode short range sub-mode is used for single tone transmission with an intended maximum range of less than 500 meters, and single tone mode long range sub-mode is used for single tone transmission with an intended maximum range from 500 meters to 5 miles.

Various features and aspects related to exemplary operation of an exemplary peer to peer protocol in an exemplary peer-to-peer communication system, in accordance with some embodiments are described below. Consider that an exemplary peer to peer protocol supports peer discovery, paging and traffic signaling. Also consider that device A and device B are two exemplary wireless communications devices implementing the peer to peer protocol.

Peer discovery operation will be described. Each of devices A and B broadcasts a peer discovery signal, which indicates the presence of the device. To broadcast its peer discovery signal, device A acquires a PDRID (peer discovery resource ID). A PDRID corresponds to a particular subset of channel resources in the peer discovery channel. To broadcast its peer discovery signal, device B acquires a PDRID. Each device monitors for peer discovery signals from other devices.

Paging operation will now be described. After receiving the peer discovery signal from device B, device A is now aware of the presence of device B. Suppose that device A intends to communicate with device B. Then, device A pages device B to establish a connection.

Traffic operation will now be described. Once the connection is available, the traffic between A and B can be transported in the connection. A connection is associated with a CID (connection ID). A CID corresponds to a particular subset of channel resources in the traffic control channel, which is used for scheduling traffic and managing interference among different peer-to-peer communication connections. Specifically, when device A intends to send the traffic to device B, device A first sends a request signal based on the CID. After device B receives a response signal from device A, device A proceeds to send a pilot, which is a wideband multi-tone signal, for device B to measure the SINR, which is fed back to device A to determine a data rate. Device A then transmits the traffic to device B using the determined data rate. Finally device B sends an acknowledgment to device A.

The above exemplary operational protocol works well with many devices, such as, e.g., smart phones, PDAs, etc. Many of those devices typically use a linear power amplifier because at least some of the signaling schemes used in the above described protocol should have linearity in the transceiver chain, e.g., linear amplification should be used for multi-tone signaling. However, it is well known that a non-linear power amplifier has lower cost and higher efficiency in comparison to a linear power amplifier. Therefore, in some embodiments, a non-linear power amplifier is used, where feasible, e.g., to reduce cost, reduce complexity and/or increase efficiency. In various embodiments, a non-linear power amplifier is included and used in a device supporting the exemplary peer to peer protocol. Such a feature is particularly desired to build a low-cost device yet to achieve relatively long discovery and traffic communication range.

In accordance with one aspect of some embodiments, a low-cost device uses a single-tone signaling scheme for transmission for most or each of its transmitted signals. The single-tone signaling scheme utilized is, e.g., a special OFDM scheme in which the signal occupies only one tone (subcarrier) in a given OFDM symbol. The tone may hop from one symbol to another, e.g., in accordance with a predetermined tone hopping pattern.

A single-tone signal, in some embodiments, is essentially a sinusoid waveform, and the amplitude remains constant. Therefore, in such an embodiment it is possible to amplify the single-tone signal with a nonlinear power amplifier, as it will not result in distortion of the signal waveform when the non-linear amplifier is used in combination with a filter. In one embodiment, the nonlinear power amplifier is a square wave signal generator, which generates a square wave according to specific frequency and phase controlled by a digital control module. The frequency of the square wave is set to be the same as the tone frequency of the single-tone. Note that the square wave includes a base sinusoid waveform and high order harmonics. The base sinusoid waveform is the desired tone signal. Depending on the carrier frequency, the tone frequency is typically in the order of 1 GHz. Therefore, the high order harmonics will be of very high frequency and can be, and are, easily filtered out, e.g., by a filter which is also employed.

In the exemplary system using the exemplary peer to peer protocol, a data segment of the traffic channel, can be and sometimes is an air link resource which carries a multi-tone signal, e.g., a multi-tone signal which occupies a portion including multiple tones or the entire system bandwidth, e.g., 5 MHz. In accordance with a feature of some embodiments, some data segments of the traffic channel intended to be used by a low-cost device transmitting on a single tone, are single-tone wide air link resources. For example, suppose that the air link resource for traffic data uses 128 tones in the 5 MHz bandwidth. A device with a linear power amplifier may use the entire 128 tones for traffic transmission, while a device with a nonlinear power amplifier may use only one tone. In one embodiment, the FFT size used to generate OFDM signal may be different for the multi-tone traffic signal, e.g., 128 tone signal, versus for the single-tone traffic signal. In some embodiments, the low-cost device may use the same tone for each of its transmitted OFDM symbols of a given data segment, thereby simplifying channel estimation. The single tone may vary from one data segment to another, e.g., pseudo randomly, and both the transmitter and the receiver of the connection know a priori the tone hopping pattern. Alternatively, the low-cost device may select to use one out of an adjacent tone pair in an individual OFDM symbol. This design retains the advantage of the channel estimation to a large extent and yet provides much better interference averaging among single-tone signals in the same data segment.

In the system using the exemplary peer to peer protocol, some devices may, and sometimes do, transmit a wideband multi-tone pilot signal for SINR estimation, as part of traffic control, before sending a data segment signal. In accordance with a feature of some embodiments, the pilot signal used for the low cost device operating in a single tone mode is a single-tone signal, and the tone position is the same as the one to be used in the data segment. Alternatively, in some embodiments, the pilot/channel quality indicator (CQI) report protocol can be skipped entirely, as the rate choice may be limited given the single-tone signaling in the data segment. Moreover, because the single-tone signal in the data segment usually causes relatively small amount of interference to other traffic signal, the traffic scheduling and interference management protocol of the traffic control channel is structured such that the single-tone connection should estimate the interference cost to/from other connections appropriately and other connections should estimate the interference cost to/from the single-tone connection appropriately, so as not to unnecessarily yield to each other due to the concern of excessive interference cost.

In some embodiments, at least some devices are equipped with both linear and nonlinear power amplifiers. Some such devices uses the linear power amplifier to send high data rate multi-tone traffic signal when the communication range is relatively short, but then switches to use the nonlinear power amplifier to send low data rate single-tone traffic signal when the communication range increases beyond certain threshold.

The techniques of various embodiments may be implemented using software, hardware and/or a combination of software and hardware. In some embodiments, modules are implemented as physical modules. In some such embodiments, the individual physical modules are implemented in hardware, e.g., as circuits, or include hardware, e.g., circuits, with some software. In other embodiments, the modules are implemented as software modules which are stored in memory and executed by a processor, e.g., general purpose computer. Various embodiments are directed to apparatus, e.g., stationary wireless nodes, mobile nodes such as mobile access terminals of which cell phones are but one example, access point such as base stations including one or more attachment points, servers, and/or communications systems. Various embodiments are also directed to methods, e.g., method of controlling and/or operating wireless communications devices including mobile and/or stationary nodes, access points such as base stations, server nodes and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, performing a linear amplification operation on a multi-tone signal; transmitting the amplified multi-tone signal; performing a non-linear amplification operation on a single tone signal; and transmitting the amplified single-tone signal.

Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

In some embodiments, the processor or processors, e.g., CPUs, of one or more devices, e.g., communications devices such as wireless terminals are configured to perform the steps of the methods described as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

While various features are described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), GSM and/or various other types of communications techniques which may be used to provide wireless communications links, e.g., peer to peer communications links between two wireless communications devices implementing a peer to peer protocol, and/or WAN wireless communications links, between access points and wireless communications device such as mobile nodes and wireless communications. The methods and apparatus may be, and in various embodiments are, used with CDMA, orthogonal frequency division multiplexing (OFDM), GSM and/or various other types of communications techniques which may be used to provide wireless communications links, e.g., direct peer to peer wireless communications links, between wireless communications devices including peer to peer interfaces. In some embodiments a wireless communications device including both a wide area network interface and a peer to peer network interface uses different communications techniques for the different interfaces, e.g., one of CDMA and GSM based techniques for the WAN interface and OFDM based techniques for the peer to peer interface. In some embodiments the access points are implemented as base stations which establish communications links with mobile nodes using CDMA, GSM and/or OFDM. In various embodiments the mobile nodes are implemented as notebook computers, personal data assistants (PDAs), or other portable devices including receiver/transmitter circuits and logic and/or routines, for implementing the methods.

What is claimed is:

1. A method of operating a communications device, the method comprising:
   performing linear amplification on a multi-tone signal during a multi-tone mode of operation;
   transmitting the amplified multi-tone signal;
   performing linear amplification on a first single-tone signal during a single-tone short range mode of operation;
   transmitting the amplified first single-tone signal;
   performing both a linear and non-linear amplification operation on a second single tone signal during a single-tone long range mode of operation; and
   transmitting the amplified second single-tone signal.

2. The method of claim 1, wherein said amplified second single-tone signal is transmitted using more transmission power than said multi-tone signal.

3. The method of claim 1, wherein performing linear amplification on said first single-tone signal during said single-tone short range mode of operation includes amplifying said first single-tone signal using a linear amplification region of a first amplifier.

4. The method of claim 3, wherein performing both linear amplification and non-linear amplification operation on the second single-tone signal during a single-tone long range mode of operation includes amplifying said second single-tone signal using both said first amplifier and a second amplifier which is a non-linear amplifier.

5. The method of claim 4, further comprising:
operating a switching module to connect said second amplifier in series with said first amplifier when said communications device switches from one of said multi-tone mode of operation or said single-tone short range mode of operation to said single-tone long range mode of operation.

6. The method of claim 5, wherein said multi-tone signal occupies a first frequency band and wherein said first single-tone signal is located within said first frequency band.

7. The method of claim 5, further comprising:
operating the switching module to disconnect said second amplifier from being in series with said first amplifier when said communications device switches from said single-tone long range mode of operation to one of said multi-tone mode of operation or said single-tone short range mode of operation.

8. A method of operating a communications device, the method comprising:
during a multi-tone mode of operation:
performing a linear amplification operation on a multi-tone signal;
transmitting the amplified multi-tone signal; during a single tone mode of operation:
performing a non-linear amplification operation on a single tone signal; and
transmitting the amplified single tone signal, said non-linear amplification operation and transmitting the amplified single tone signal being performed;
switching from the multi-tone mode of operation to the single tone mode of operation as part of a change from transmitting traffic data to transmitting discovery information; and
wherein said multi-tone and single tone modes of operation correspond to different non-overlapping periods of time.

9. The method of claim 8, wherein said single tone mode of operation is used for transmitting peer discovery information while said multi-tone mode of operation is used for transmitting traffic data.

10. A communications device comprising:
means for performing linear amplification on a multi-tone signal during a multi-tone mode of operation;
means for transmitting the amplified multi-tone signal;
means for performing linear amplification on a first single-tone signal during a single-tone short range mode of operation;
means for performing both linear and non-linear amplification on a second single tone signal during a single-tone long range mode of operation; and
means for transmitting the amplified first single-tone signal and the amplified second single-tone signal.

11. The communications device of claim 10, wherein said means for transmitting said amplified first single tone signal and said second single-tone signal transmits said amplified second single tone signal using more transmission power than said means for transmitting said multi-tone signal uses when transmitting said amplified multi-tone signal.

12. The communications device of claim 10, wherein said means for performing linear amplification includes means for amplifying said first single-tone signal using a linear amplification region of a first amplifier.

13. The communications device of claim 12, wherein said means for performing both linear amplification and non-linear amplification on the second single-tone signal during a single-tone long range mode of operation includes means for amplifying said second single-tone signal using a second amplifier which is a non-linear amplifier.

14. The communications device of claim 13, further comprising:
means for controlling a switch to connect said second amplifier in series with said first amplifier when said communications device switches from one of said multi-tone mode of operation or said single-tone short range mode of operation to said single-tone long range mode of operation.

15. A computer program product for use in a communications device, the computer program product comprising:
a non-transitory computer readable medium comprising:
code for causing at least one computer to perform linear amplification on a multi-tone signal during a multi-tone mode of operation;
code for causing said at least one computer to transmit the amplified multi-tone signal;
code for causing said at least one computer to perform linear amplification on a first single-tone signal during a single-tone short range mode of operation;
code for causing said at least one computer to transmit the amplified first single-tone signal;
code for causing said at least one computer to perform both linear and non-linear amplification on a second single tone signal during a single-tone long range mode of operation; and
code for causing said at least one computer to transmit the amplified single-tone signal.

16. A communications device comprising:
at least one processor configured to:
perform linear amplification on a multi-tone signal during a multi-tone mode of operation;
transmit the amplified multi-tone signal;
perform linear amplification on a first single-tone signal during a single-tone short range mode of operation;
transmit the amplified first single-tone signal;
perform both linear and non-linear amplification operation on a second single tone signal during a single-tone long range mode of operation; and
transmit the amplified second single-tone signal; and
memory coupled to said at least one processor.

17. The communications device of claim 16, wherein at least one processor is configured to transmit said amplified second single tone signal using more transmission power than said multi-tone signal.

18. The communications device of claim 16, wherein said at least one processor is configured to amplify said first single-tone signal using a linear amplification region of a first amplifier as part of being configured to perform a linear amplification on said first single-tone signal during said single-tone short range mode of operation.

19. The communications device of claim 18, wherein said at least one processor is configured to amplify said second single-tone signal using both said first amplifier, and a second amplifier which is a non-linear amplifier, as part of being configured to perform both linear and non-linear amplification operation on the second single-tone signal during a single-tone long range mode of operation.

20. The communications device of claim 18, wherein said at least one processor is configured to control a switching module to connect said second amplifier in series with said first amplifier when said communications device switches from one of said multi-tone mode of operation or said single-tone short range mode of operation to said single-tone long range mode of operation.

* * * * *